No. 749,650. PATENTED JAN. 12, 1904.
R. W. WELCH.
RICE HULLING MACHINE.
APPLICATION FILED OCT. 29, 1902.
NO MODEL.
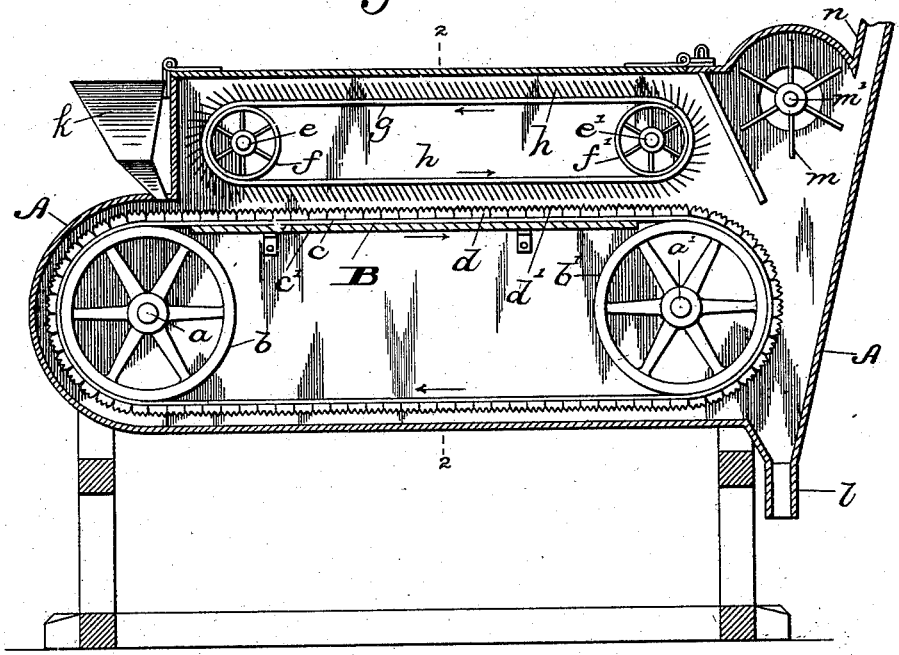
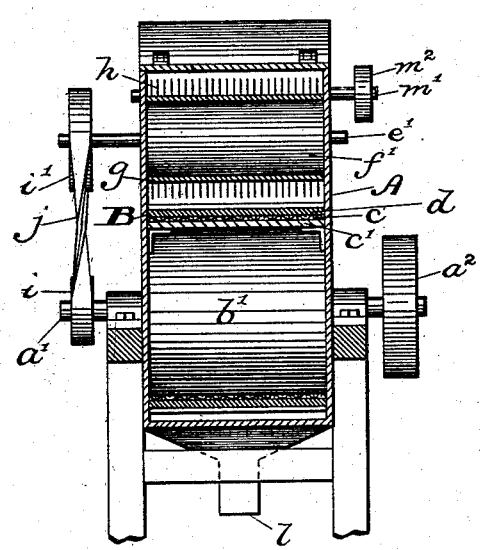
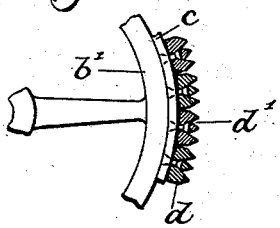
Witnesses.
H. F. Meyer Jr.
Frederick S. Stitt.
Inventor.
Rosia W. Welch
By Mann & Co.
Attorneys.

No. 749,650. Patented January 12, 1904.

UNITED STATES PATENT OFFICE.

ROSIA W. WELCH, OF BALTIMORE, MARYLAND, ASSIGNOR, BY DIRECT AND MESNE ASSIGNMENTS, TO ROYAL MILLING AND MANUFACTURING COMPANY, A CORPORATION OF MAINE.

RICE-HULLING MACHINE.

SPECIFICATION forming part of Letters Patent No. 749,650, dated January 12, 1904.

Application filed October 29, 1902. Serial No. 129,194. (No model.)

*To all whom it may concern:*

Be it known that I, ROSIA W. WELCH, a citizen of the United States, residing at Baltimore, State of Maryland, have invented certain new and useful Improvements in Rice-Hulling Machines, of which the following is a specification.

This invention relates to certain improvements in machines for hulling rice and similar grain, as will be hereinafter fully described and claimed.

Reference is to be had to the accompanying drawings, in which—

Figure 1 is a side elevation of the machine with the casing in section to better illustrate the construction. Fig. 2 is a transverse sectional view of the machine, taken on the line 2 2 of Fig. 1. Fig. 3 is an enlarged detail view illustrating in longitudinal section a portion of the transversely-corrugated belt conveyer for the grain. Fig. 4 is a detail plan view of one of the corrugated plates which together form the surface of the belt conveyer.

Referring to the drawings, the letter A designates a casing provided at its opposite ends with transverse shafts $a$ $a'$ in horizontal alinement with each other, and on each of said shafts is mounted a cylinder, (designated $b$ $b'$.) An endless belt conveyer B is mounted to pass over said two cylinders with its two laps running in a horizontal direction, and said conveyer comprises a belt proper, $c$, of canvas or other suitable material, and a plurality of corrugated plates $d$, secured to the said belt $c$ by rivets or the like. The said plates and their corrugations $d'$ extend transversely of the belt, and the plates abut one against the other and cover the entire outer surface of the belt, as indicated in Fig. 1. The upper lap of the belt conveyer slides along a horizontal supporting-ledge $c'$, secured in the casing, whereby to prevent said lap from sagging.

Within the upper portion of the casing A are journaled two shafts $e$ $e'$ in horizontal alinement with each other and carrying two cylinders $f$ $f'$. Mounted to pass over said two cylinders $f$ $f'$ is an endless comb-belt $g$, whose lower lap runs in proximity to the upper lap of the belt conveyer B therebeneath, as indicated in Fig. 1. The upper belt $g$, just mentioned, is provided on its outer surface and throughout the area thereof with numerous and closely-grouped spring-teeth $h$, all of which trend in the direction the said belt is intended to be run, as indicated by the darts, Fig. 1. Hence the said teeth on the lower lap of said belt (that lap which is adjacent to the upper lap of the belt conveyer B) trend rearwardly toward the discharge end of the machine, as shown.

One of the belt-conveyer shafts $a'$ and the corresponding comb-belt shaft $f'$ are provided with pulleys, (designated $i$ $i'$,) as shown in Fig. 2, said pulleys being connected together by a band $j$, twisted so that both of said pulleys, and consequently both of said belts, will run in opposite directions, and in this connection it is to be noted that the pulley $i$ of the belt-conveyer shaft $a'$ is smaller than the other pulley $i'$, whereby the said belt conveyer will run at a higher rate of speed than the comb-belt $g$.

A hopper $k$ is secured at one end of the casing A just above the belt conveyer, and a bottom discharge-spout $l$ is located at the opposite end of the casing, and above said discharge-spout is mounted a rotary fan $m$, adapted to carry off the hulls and particles of skin through a chute $n$. Both the fan-shaft $m'$ and one of the conveyer-shafts $a'$ are provided with driving-pulleys $m^2$ $a^2$, respectively.

In practical construction the ends of the spring-teeth $h$ contact with the corrugated plates $d$, though in the drawings they are slightly spaced from said plates for the sake of clearness.

In practical operation the rice, say, is fed in a comparatively small quantity at a time into the hopper $k$, whence it passes onto the belt conveyer B, which is moving in the direction indicated by the darts, Fig. 1. To get the best results, the rice is fed in quantities sufficient to only fill the transverse corrugations $d'$, and it is carried in said corrugations into contact with the spring-teeth $h$. Now it is to be observed that the comb-belt $g$ is moving in opposite directions to the belt conveyer B and at a different, and in this instance slower, speed. Hence the spring-teeth will act with an abrasive and dragging action on the rice, and such action opens the hull and allows the kernel to come out of the same.

As the comb-belt $g$ runs in the opposite direction to the belt conveyer B, the contiguous laps of the two belts run in the same direction, and hence do not tend to choke up the machine, but keep the machine running clear.

Having thus described my invention, what I claim as new, and desire to secure by Letters Patent, is—

A machine of the character described, comprising a casing provided at one end with a hopper and at the other end with a discharge, a horizontally-running belt conveyer mounted in said casing and provided with a series of transversely-extending corrugated plates secured to the belt conveyer and abutting one against the other and covering the entire outer surface of the said belt conveyer, a horizontally-running comb-belt mounted in said casing above said belt conveyer and provided with spring-teeth inclined in such direction that on the lower lap they will trend toward the discharge end of the casing, and a pulley for each of said belts, the pulley for the belt conveyer being smaller than the pulley for the comb-belt, whereby the former will run faster than the latter, and said pulleys being connected to run the belts in opposite directions, as and for the purpose set forth.

In testimony whereof I affix my signature in the presence of two witnesses.

ROSIA W. WELCH.

Witnesses:
G. FERDINAND VOGT,
FREDERICK S. STITT.